United States Patent
Jones et al.

(10) Patent No.: US 10,595,123 B2
(45) Date of Patent: Mar. 17, 2020

(54) SYSTEMS AND METHODS FOR TRACKING A CLEANING DEVICE IN A SHOPPING SPACE

(71) Applicant: Walmart Apollo, LLC, Bentonville, AR (US)

(72) Inventors: Matthew A. Jones, Bentonville, AR (US); Nicholaus A. Jones, Fayetteville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 130 days.

(21) Appl. No.: 15/828,498

(22) Filed: Dec. 1, 2017

(65) Prior Publication Data
US 2018/0160223 A1 Jun. 7, 2018

Related U.S. Application Data

(60) Provisional application No. 62/429,238, filed on Dec. 2, 2016.

(51) Int. Cl.
*H04R 1/40* (2006.01)
*G06Q 50/28* (2012.01)
(Continued)

(52) U.S. Cl.
CPC .............. *H04R 1/406* (2013.01); *A47L 11/28* (2013.01); *A47L 11/40* (2013.01);
(Continued)

(58) Field of Classification Search
USPC .......... 381/26, 91, 92, 111, 122, 375, 56, 61
See application file for complete search history.

(56) References Cited

U.S. PATENT DOCUMENTS

| | | |
|---|---|---|
| 5,652,593 A | 7/1997 | Rench |
| 5,940,346 A | 8/1999 | Sadowsky |

(Continued)

OTHER PUBLICATIONS

Canistro et al., Howard A.; "Projectile-impact-location detremination: an acoustic triangular method"; Measurement Science and Technology; vol. 7, No. 12; Aug. 28, 1996; pp.
(Continued)

*Primary Examiner* — Yosef K Laekemariam
(74) *Attorney, Agent, or Firm* — Fitch, Even, Tabin & Flannery LLP (57) ABSTRACT

Systems, apparatuses and methods are provided for tracking cleaning devices in a shopping space. A system for tracking cleaning devices comprises: a sound sensor array, a cleaning device database storing location information and sound profiles associated with a plurality of cleaning device identifiers, and a control circuit configured to: identify a cleaning device sound made by a movement of a cleaning device, determine a current location of the cleaning device based on the cleaning device sound, match the cleaning device to a cleaning device identifier in the cleaning device database, update the location information associated the cleaning device identifier in the cleaning device database based on the current location of the cleaning device, update the sound profile of the cleaning device identifier based on the cleaning device sound captured by the sound sensor array, and determine that a component of the cleaning device needs to be replaced.

16 Claims, 3 Drawing Sheets

(51) Int. Cl.
*H04R 3/00* (2006.01)
*A47L 11/28* (2006.01)
*A47L 11/40* (2006.01)

(52) U.S. Cl.
CPC .......... *A47L 11/4011* (2013.01); *G06Q 50/28* (2013.01); *H04R 3/005* (2013.01)

(56) References Cited

U.S. PATENT DOCUMENTS

| | | | |
|---|---|---|---|
| 7,328,088 B2* | 2/2008 | Kim | G01S 5/30 700/245 |
| 7,630,792 B2 | 12/2009 | Kim | |
| 2017/0049288 A1* | 2/2017 | Knutson | A47L 11/4011 |

OTHER PUBLICATIONS

Filonenko, Viacheslav; "Asynchronous Ultrasonic Trilateration for Indoor Positioning of Mobile Phones"; Dublin Institute of Technology; Dec. 2012; pp. 1-248.
O'Donnell et al., Colin F.; "Close approaches and acoustic triangulation: techniques for mapping the distribution of booming Australasian bittern (*Botaurus poiciloptilus*) on small wetlands"; Notornis; vol. 60; Sep. 20, 2013; pp. 279-284.
Ormonde, Shane; "Sound triangulation using cheap microphones"; https://shaneormonde.wordpress.com/2013/11/10/soundtriangulationusingcheapmicrophones/; Jul. 21, 2016; pp. 1-3.

* cited by examiner

SYSTEMS AND METHODS FOR TRACKING A CLEANING DEVICE IN A SHOPPING SPACE

RELATED APPLICATION

This application claims the benefit of U.S. Provisional Application No. 62/429,238 filed on Dec. 2, 2016, which is incorporated herein by reference in its entirety.

TECHNICAL FIELD

This invention relates generally to in-store activity monitoring.

BACKGROUND

In modern retail environments, there is a need to improve the customer experience. Providing a pleasant or improved customer experience can lead to customer satisfaction and repeat returns to the shopping location. Further, the customer experience at the shopping facility can have significant effects on current sales. Part of the customer experience includes, for example, cleanliness of the shopping area.

Retail establishments typically use industrial floor cleaning devices to clean various floor surfaces of a shopping area. It can be advantageous to track floor cleaning devices and monitor operational fitness of the floor cleaning devices during operation throughout the shopping area.

BRIEF DESCRIPTION OF THE DRAWINGS

Disclosed herein are embodiments of apparatuses and methods for tracking a cleaning device in a shopping space. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some application", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses and methods are provided herein for tracking cleaning devices in a shopping space. A system for tracking cleaning devices in a shopping space comprises: a sound sensor array covering at least a portion of the shopping space, a cleaning device database storing location information and sound profiles associated with a plurality of cleaning device identifiers, and a control circuit coupled to the sound sensor array and the cleaning device database. The control circuit is configured to: identify, in sounds captured by the sound sensor array, a cleaning device sound made by a movement of a cleaning device traveling in the shopping space; determine a current location of the cleaning device based on the cleaning device sound; match the cleaning device to a cleaning device identifier in the cleaning device database based on at least comparing the current location of the cleaning device to the location information of the plurality of cleaning device identifiers; update the location information associated the cleaning device identifier in the cleaning device database based on the current location of the cleaning device; update the sound profile of the cleaning device identifier based on the cleaning device sound captured by the sound sensor array; and determine that a component of the cleaning device needs to be replaced based on at least one of a distance traveled by the cleaning device, a duration of operation of the cleaning device, and a detected change in one or more cleaning device sounds over time.

Typically, large retail establishments use industrial floor cleaning devices to clean various floor surfaces of a shopping area. As appreciated by one of ordinary skill in the art, different floor surfaces call for different types of floor cleaning devices. Examples of floor cleaning devices may include, but are not limited to, buffers, polishers, burnishers, scrubbers, sweepers, carpet extractors, wet vacuums, dry vacuums, shampooers, and the like. Each cleaning device may produce one or more sounds during operation, which may be unique to the device type, and even unique to the individual device itself. In some cases, the sounds produced by the cleaning device may change over time based on, for example, wear-and-tear of components in the cleaning device. In some embodiments, the locations and traffic patterns of cleaning devices can be tracked, and operation fitness of cleaning devices can be monitored, by placing sound sensors around the sales floor to record the distinct sound of cleaning devices during use. The sounds produced by the cleaning device during use allow the system to track the cleaning device throughout the shopping area and to determine that a component of the cleaning device may need to be replaced. In some embodiments, the system may determine that a component of the cleaning device needs to be replaced based on at least one of a distance traveled by the cleaning device, a duration of operation of the cleaning device, and a detected change in one or more cleaning device sounds over time. The system may then generate an alert notifying a store worker that the specific component of the cleaning device needs to be replaced.

In some embodiments, the sounds detected by the sensors may include any sound produced by the cleaning device as it cleans a floor surface of a shopping area. For example, the sounds detected by the sensors may include, or otherwise correspond to, a sound produced by a cleaning surface of the cleaning device contacting a floor surface being cleaned by the cleaning device, a sound produced by a fuel container coupled to the cleaning device, a sound produced by a pump coupled to the cleaning device, and/or a sound produced by a motor coupled to the cleaning device. In some embodiments, the sounds detected by the sensors may be inside and/or outside of human hearing ranges. In some embodiments, locations of one or more cleaning devices may be calculated based on directional sound detection and/or triangulation from the positions of sound sensor devices in a sound sensor array. The system may then determine a route traveled by the cleaning device based on a history of tracked locations of the cleaning device over time.

Some embodiments may further comprise a cleaning schedule database, which may store floor cleaning schedules for the shopping space. In some embodiments, the system may determine an optimum schedule and/or route for one or more cleaning device(s) in one or more zones in the shopping space based on, for example, cleaning device availability, previous tracked routes, frequency of use, known customer traffic patterns, etc. in the one or more zones of the shopping space. In such a case, the system may update a cleaning schedule database to reflect the optimum schedule and/or route(s) for the cleaning device(s) in the one or more zones of the shopping space based on, for example, cleaning device availability, previous tracked routes, frequency of use, known customer traffic patterns, etc. in the one or more zones of the shopping space. In some embodiments, the system may be configured to estimate the wear-and-tear of a floor surface being cleaned (or having been previously cleaned) by a cleaning device based on the cleaning history one or more tracked routes. For example, the system may determine that floor surfaces comprising one or more tracked routes may need to be refinished, refurbished, or even replaced based on, for example, the frequency of cleaning of the tracked routes. In such a case, the composition of the floor surface may also be taken into account, as the lifespan of different floor surfaces may vary significantly.

Figure 1:
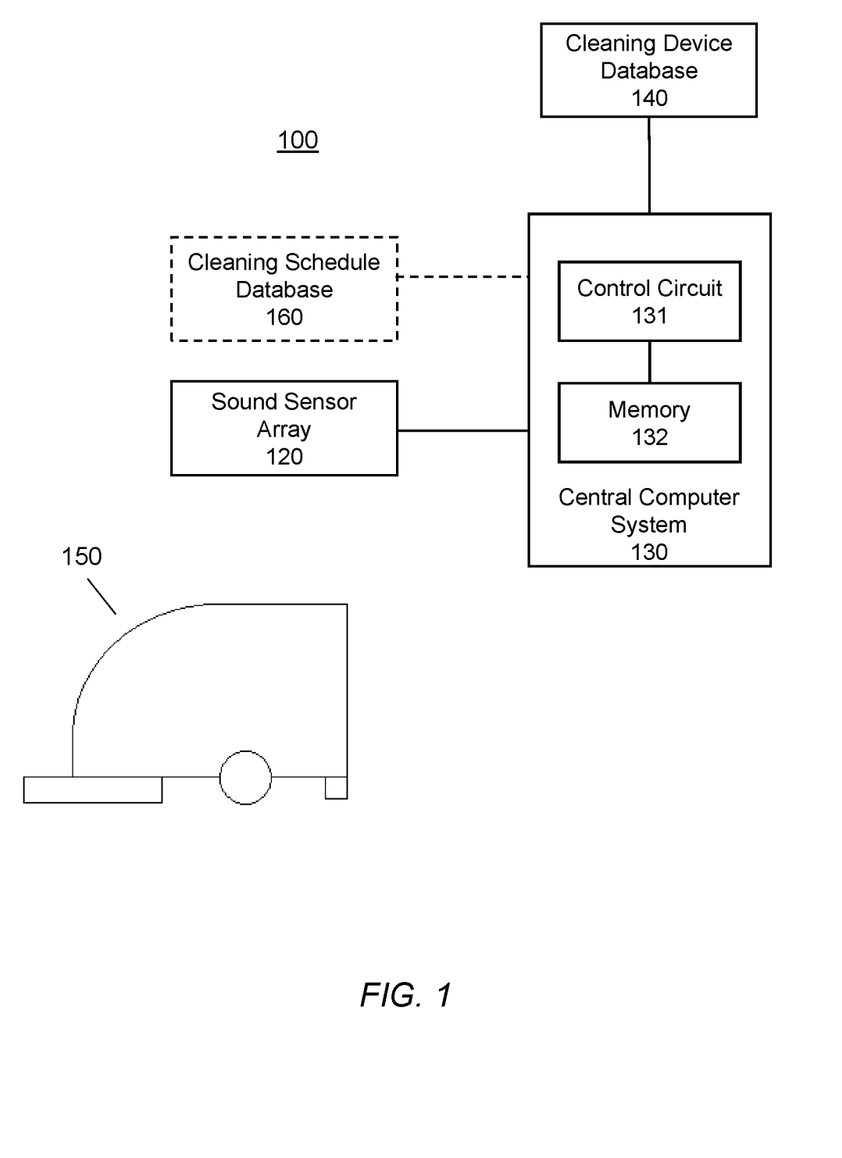
FIG. 1 is a block diagram of a system in accordance with several embodiments.

Referring now to FIG. 1, a system for tracking a cleaning device in a shopping space is shown. The system 100 includes a central computer system 130, a cleaning device database 140, and a sound sensor array 120 for detecting sounds from cleaning devices 150. In some embodiments, the system may also include an optional cleaning schedule database 160.

The sound sensor array 120 may generally be configured to capture sounds in a shopping space and transmit the sound to the central computer system 130. In some embodiments, the sound sensor array 120 may comprise an array of sound sensor devices positioned throughout a shopping space. The sound sensor array 120 may comprise stationary sound sensors installed in the shopping space. For example, the sound sensor array 120 may be installed in the celling, pillars, beams, modules, display shelves, etc. of a shopping space. In some embodiments, the sound sensor array 120 may comprise sound sensor devices tuned to a narrow band of the frequencies associated with sound frequencies typically generated by the movement of various floor cleaning devices 150 such as, for example, buffers, polishers, burnishers, scrubbers, sweepers, carpet extractors, wet vacuums, dry vacuums, shampooers, and the like. In some embodiments, the sound sensor array 120 may comprise one or more directional microphones including a plurality of microphone devices each pointing away from a center of the device in a different direction. The times that a sound reaches each of the microphones in the directional microphone device may be compared to determine a direction of the sound source relative to the directional microphone.

The central computer system 130 includes a control circuit 131 and a memory 132 and may generally be any processor-based device such as one or more of a computer system, a server, a networked computer, a cloud-based server, etc. The control circuit 131 may comprise a central processing unit, a processor, a microprocessor, and the like. The control circuit 131 may be configured to execute computer readable instructions stored on the memory 132. The memory 132 may comprise volatile and/or non-volatile computer readable storage memory and have stored upon it a set of computer readable instructions which, when executed by the control circuit 131, causes the system to update locations of one or more cleaning devices 150 in a shopping space based on sound detected by the sound sensor array 120. The central computer system 130 may be coupled to the sound sensor array 120 via a wired and/or wireless signal connections. In some embodiments, the central computer system 130 may be configured to process the sound collected by the sound sensor array 120 to isolate sounds made by the cleaning device 150. The central computer system 130 may then be configured to identify a location of the cleaning device 150. The identification of the location of the cleaning device 150 may be determined based on one or more of the location of the sound source and the detected sound's characteristics (e.g. frequency, tone, modulation, amplitude, duration, etc.) as compared to stored sound profiles of cleaning devices being tracked. The location of the sound source may be determined based on performing trilateration and/or triangulation for the position of the cleaning device 150 using sounds captured by two or more directional and/or non-directional sound sensor devices of the sound sensor array 120 that are spaced apart and/or amplitudes of the cleaning device sound captured by the two or more sensors of the sound sensor array 120. The central computer system 130 may then be configured to update the location information associated the cleaning device identifier in the cleaning device database 120 based on the current location of the cleaning device 150 and update the sound profile of the cleaning device identifier based on the cleaning device sound captured by the sound sensor array 120. In some embodiments, the cleaning device sound may correspond to at least one of a sound produced by a cleaning surface of the cleaning device 150 contacting a floor surface being cleaned by the cleaning device, a sound produced by a fuel container coupled to the cleaning device 150, a sound produced by a pump coupled to the cleaning device 150, and a sound produced by a motor coupled to the cleaning device 150.

The cleaning device 150 may generally be any floor cleaning device configured to clean any floor surface in a shopping space. Examples of floor cleaning devices include, but are not limited to polishers, burnishers, scrubbers, sweepers, carpet extractors, wet vacuums, dry vacuums, shampooers, and the like. The cleaning device 150 may comprise various components, such as, for example, buffing pads, scrubbing pads, squeegees, brooms, brushes, vacuum bags, filters, motors, switches, solenoids, pumps, circuit breakers, belts, hoses, cables, connectors, a cleaning solution container, a fuel container, wheels/tires, and the like. During operation of the cleaning device 150, one or more components of the cleaning device 150 may generate one or more sounds due to the cleaning device's movement.

Generally, the cleaning device 150 may emit a variety of sounds due to striking, scraping, and/or rubbing between the various components within the cleaning device 150 and/or against the floor surface being cleaned. For example, sound may be produced when a cleaning surface of the cleaning device 150, such as, for example, a buffing pad, scrubbing pad, squeegee, or vacuum head, contacts a floor surface during operation of the cleaning device 150. In another example, sound may be produced by a fuel container or cleaning solution container coupled to the cleaning device 150 during cleaning. In yet another example, sound may be produced by a pump coupled to the cleaning device, such as, for example, a water pump. In yet another example, sound may be produced by a motor coupled to the cleaning device 150 during operation of the device.

The sounds produced by the cleaning device 150 during use allow the central computer system 130 to track the cleaning device 150 throughout the shopping area and to monitor operational fitness of the cleaning device so as to enable a determination that a component of the cleaning device may need to be replaced. As one or more components of the cleaning device 150 begins to fail or show signs of wear or imminent failure, characteristics of the sounds emitted from the cleaning device 150 (e.g. frequency, tone, modulation, amplitude, duration, etc.) may change over time. In some embodiments, the central computer system 130 may determine that one or more components of the cleaning device 150 needs to be replaced based on, for example, a detected change in characteristics of one or more cleaning device sounds over time. In some embodiments, the central computer system 150 may determine, or in some cases even predict, that one or more components of the cleaning device 150 needs to be replaced based on, for example, a distance traveled by the cleaning device 150 and/or the duration of operation of the cleaning device 150, both of which may correlate to expected lifespans of various components of the cleaning device 150. In some embodiments, the central computer system may automatically generate an alert notifying a store worker that the specific component of the cleaning device 150 needs to be replaced.

In some embodiments, the central computer system 130 may further determine a path of the cleaning device 150 based on a history of tracked locations. In some embodiments, the central computer system 130 may be configured to automatically generate one or more alerts and/or tasks based on the tracked location(s) and/or route(s) of cleaning device (s). Likewise, cleaning device 150 locations determined based on the sound collected by the sound sensor array 120 may be used to map out and analyze cleaning patterns of different areas of a shopping space over time to optimize cleaning efficiency. Some embodiments may further include a cleaning schedule database 160, which may store floor cleaning schedules for the shopping space, and the central computer system 130 may be configured to determine an optimum schedule and/or route for the one or more cleaning device(s) 150 in one or more zones in the shopping space based on, for example, cleaning device availability, frequency of use, previous tracked routes, known customer traffic patterns, etc. in the one or more zones of the shopping space. In such a case, the system may update the cleaning schedule database 160 to reflect the optimum schedule and/or route(s) for the cleaning device(s) 150 in the one or more zones of the shopping space. In some embodiments, the central computer system 130 may be configured to estimate the wear-and-tear of a floor surface being cleaned (or having been previously cleaned) by a cleaning device 150 based on the cleaning history one or more tracked routes stored in the cleaning schedule database 160. For example, the central computer system 130 may determine that floor surfaces comprising one or more tracked routes may need to be refinished, refurbished, or even replaced based on, for example, the frequency of cleaning of the tracked routes. In such a case, the composition of the floor surface may also be taken into account, as the lifespan of different floor surfaces may vary significantly.

The cleaning device database 140 and the optional cleaning schedule database 160 generally comprise volatile and/or non-volatile computer readable storage memory device(s). While the cleaning device database 140 and the optional cleaning schedule database 160 are shown as separate components from the memory 132 of the central computer system 130 in FIG. 1, in some embodiments, the cleaning device database 140 and the memory 132 may be implemented with the same one or more memory devices. In some embodiments, the cleaning schedule database 160 and the memory 132 may be implemented with the same one or more memory devices. In some embodiments, the cleaning device database 140, the cleaning schedule database 160, and the memory 132 may be implemented with the same one or more memory devices.

The cleaning device database 140 may generally store the last known location and a location history for one or more cleaning devices in a shopping space. In some embodiments, the cleaning device database 140 may further store sound profiles for each of the cleaning devices being tracked. In some embodiments, when a cleaning device 150 leaves a cleaning device storage area, a new cleaning device identifier may be created and/or assigned in the cleaning device database 140. The system may record the initial sound characteristics of the cleaning device 150 to create a sound profile for the cleaning device identifier and store it in the cleaning device database and/or another database. When the system detects a cleaning device sound at a new location, the system may compare the location and the sound characteristics of the captured sound with the stored cleaning device locations and sound profiles to determine which cleaning device identifier of the cleaning device being tracked matches the detected cleaning device sound. In some embodiments, the comparison may comprise selecting the most likely match. For example, the system may first select cleaning device identifiers with a previous location in proximity of the location of the detected sound and then compare the sound profiles associated each cleaning device identifier with the captured sound to find the closest sound profile match. Once a match is determined, the system may update the last known location and/or the sound profile of the matched shopping cleaning device identifier with the location and the sound characteristics of the detected sound in the cleaning device database 140. In some embodiments, this process may be repeated for a cleaning device identifier stored in the cleaning device database 140 until the cleaning device is detected to have been returned to a storage area.

Figure 2:
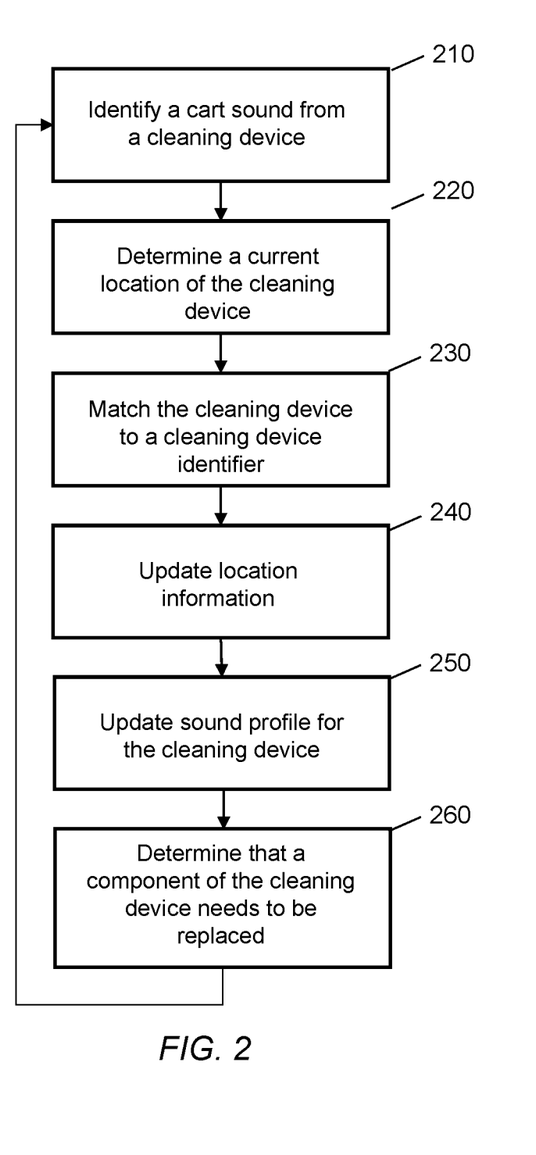
FIG. 2 is a flow diagram of a method in accordance with several embodiments.

Referring now to FIG. 2, a method for tracking a cleaning device in a shopping space is shown. Generally, the method shown in FIG. 2 may be implemented with a processor based device such as a control circuit, a central processor, and the like. In some embodiments, the method shown in FIG. 2 may be implemented with the central computer system 130 in FIG. 1.

In step 210, the system identifies a cleaning device sound in the sounds captured by a sound sensor array in a shopping space. In some embodiments, the sound sensor array may comprise the sound sensor array 120 described with reference to FIG. 1. The sound sensor array may generally be configured to capture sounds produced by the movement of cleaning devices and transmit the sound to a central computer system. In some embodiments, the sound sensor array may comprise an array of sound sensor devices positioned throughout a shopping space. The sound sensor array may comprise stationary sound sensors installed in the shopping space. For example, the sound sensor array may be installed in the ceiling, pillars, beams, modules, display shelves, etc. of a shopping space. In some embodiments, the sound sensor array may comprise one or more directional microphones configured to determine the direction of a sound source relative to the directional microphone.

The identified cleaning device sound may generally correspond to sounds made by a cleaning device due to a movement of the cleaning device through the shopping area. The cleaning device may comprise any floor cleaning device configured to clean any floor surface in a shopping space. Examples of floor cleaning devices include, but are not limited to polishers, burnishers, scrubbers, sweepers, carpet extractors, wet vacuums, dry vacuums, shampooers, and the like. Generally, the cleaning device may emit a variety of sounds due to striking, scraping, and/or rubbing between various components within the cleaning device and/or against the floor surface being cleaned, which may be detected by the sound sensor array. For example, sound may be produced when a cleaning surface of the cleaning device, such as, for example, a buffer surface, contacts a floor surface during operation of the cleaning device. In another example, sound may be produced by a fuel container coupled to the cleaning device during cleaning. In yet another example, sound may be produced by a pump coupled to the cleaning device, such as, for example, a water pump. In yet another example, sound may be produced by a motor coupled to the cleaning device during operation of the device.

In some embodiments, the system may be configured to determine a baseline noise profile of the shopping space and remove a baseline noise from the sound captured by the sound sensor array to detect sounds produced by the movement of cleaning devices. In some embodiments, the baseline noise profile may be generated and/or updated by capturing the ambient noise of the shopping space with the sound sensors. In some embodiments, the system may be configured to filter the sound captured by the sound sensor to isolate sounds matching typical sound characteristics profiles of cleaning devices. For example, the captured sound may be filtered to remove all sounds outside of the frequencies typically associated with movements of cleaning devices. In some embodiments, the system may be configured to determine whether a sound is produced by a cleaning device based one or more of the frequency, the tone, the modulation, the amplitude, and the duration of the captured sound.

In step 220, the system determines a current location of the cleaning device based on the cleaning device sound identified in step 210. In some embodiments, the system may be configured to determine a location of the sound source based on the locations of sound sensors in the sound sensor array that detected the cleaning device sound. In some embodiments, the system may be configured to determine a sound source location based on trilateration and/or triangulation from the locations of two or more sound sensor devices. For example, if the two sensor sensors spaced apart from each other detect a sound having a matching characteristic, the system may be configured to determine an estimated distance and/or angle between the sound source and each sound device based on the relative arrival time of the sound detected at each sound sensor. In some embodiments, a direction of the sound source may be determined with:

$$\Delta t = \frac{x \sin\theta}{c},$$

in which $\Delta t$ represents arrival time difference, x represents the distance between the two sound sensors, c represents the speed of sound, and $\theta$ may be solved for the angle between the baseline of the sensors and the incident sound. In some embodiments, the determined angle from multiple sensors may be used to triangulate a point in the shopping space based on the locations of the sound sensors. In some embodiments, the system may use the amplitude of the cleaning device sound as captured by two or more, and in some embodiments three or more, sound sensors to estimate the sound source's distances to each of the sound sensors. A location may then be estimated based on the distances from each sound sensor.

In some embodiments, the location of the sound source may be determined based at least partially on trilateration. For example, the distances between each of the sound source and each sound sensor may be determined based on the difference in time of arrival of the detected cleaning device sound. For example, if a sound arrives at the first sound sensor device at $t_1$ and at the second sound sensor device at $t_2$ before $t_1$, and the distance between the first and second sound sensors is $d_3$, the distance between the sound source and the first sound sensor ($d_1$) may be solved from $d_1^2 = d_3^2 + (d_1 - (t_1 - t_2)c)^2$, assuming that the distance between the sensors $d_3$ is smaller than $d_1$. The distance between the second sensor and the sound source may be represented by $d_2 = d_1 - (t_1 - t_2)c$. With $d_2$ and $d_1$, the system may determine a circle of possible points for the sound source. If the cleaning devices are generally assumed to be on plane a few feet above the floor of the shopping space, the intersection of the plane and the circle of possible points may yield two possible locations for the sound source. In some embodiments, the system may similarly calculate the distance between the sound source and a third sound sensor device to triangulate and narrow down the location of the sound source.

In some embodiments, the sound sensor array may comprise one or more directional microphones having a plurality of microphones pointed in different directions. The system may determine the direction of the sound source based on the time of arrival and/or sound amplitude at each microphone device in the directional microphone. For example, the sound would first arrive at the microphone device pointed most directly at the sound source. The system may then determine a point in the shopping space based on the direction and/or distance of the sound source detected by two or more directional microphones based on either triangulation or trilateration. In some embodiments, the system may have stored in its memory a map of the shopping space indicating pathways that cleaning devices may travel. The system may use the map to further narrow down the possible locations of the sound source.

In step 230, the cleaning device is matched to a cleaning device identifier in a cleaning device database. The cleaning device database may generally store the last known location of one or more cleaning device in a shopping space. In some embodiments, when a cleaning device leaves a storage area, a new cleaning device identifier may be created in the cleaning device database.

In some embodiments, the system may compare the location of the cleaning device sound determined in step 220 to the last known locations of cleaning device tracked in the cleaning device database to match the detected cleaning device to a tracked cleaning device. For example, the detected cleaning device may be matched to a tracked cleaning device identifier based on one or more of the proximity of the detected location and the last known location, a previously detected direction of travel of the cleaning device identifier, and a previously detected speed of travel of the cleaning device identifier. In some embodiments, the cleaning device database may store a history of locations for each tracked cleaning device identifier and only match the cleaning device identifier to a detected cleaning device if the current location could be a logical next location based on the location history. For example, the route distance between the last known location and the detected location must be a distance that can be reasonably covered within the time span.

In some embodiments, if two or more possible cleaning device identifier matches are found based on location information alone, the system may compare the sound characteristics of the sound identified in step 210 with sound profiles associated with the matching cleaning device identifiers to select one of the cleaning device identifiers as the match. For example, if two cleaning device cross paths, the system may distinguish the two cleaning device from each other when their paths diverge based on comparing the captured sound of cleaning device heading in different directions with sound profiles associated with the cleaning device identifiers. In some embodiments, the sound profiles may comprise a recording of one or more previously recorded sounds from the tracked cleaning device and/or one or more of the frequency, the tone, the modulation, the amplitude, and the duration data of the cleaning device sound. In some embodiments, the sound profile may correspond to a combination of sounds of different frequencies, tones, modulations, relative amplitudes, and durations. For example, the sound profile may comprise sounds made by a cleaning device due to a movement of the cleaning device through the shopping area. Generally, the cleaning device may emit a variety of sounds due to striking, scraping, and/or rubbing between various components within the cleaning device and/or against the floor surface being cleaned. For example, sound may be produced when a cleaning surface of the cleaning device, such as, for example, a buffer surface, contacts a floor surface during operation of the cleaning device. In another example, sound may be produced by a fuel container coupled to the cleaning device during cleaning. In yet another example, sound may be produced by a pump coupled to the cleaning device, such as, for example, a water pump. In yet another example, sound may be produced by a motor coupled to the cleaning device during operation of the device. The sounds made by the movement of a cleaning device may change with time and use.

In some embodiments, the system may match the detected sound to a sound profile with the most similar sound characteristics without requiring the sounds to be identical to determine a match. For example, the system may first narrow down the possible cleaning device identifiers based on location, and then select the cleaning device identifier having a profile that is the most similar to the detected cleaning device sound as the match. In some embodiments, the sound profile may comprise a history of captured sounds, and the captured sound may be compared to the characteristics of one or more previously captured sound instances. In some embodiments, the system may compare both the current location and the captured sound with the locations and sound profiles of tracked cleaning devices in the cleaning device database. The system may only determine a match between a detected cleaning device sound and a tracked cleaning device identifier if both the current location and the sound characteristic of the captured cleaning device sound are a close enough matches to the last known location(s) and the sound profile of the cleaning device identifier.

In some embodiments, if the current location of the cleaning device is determined to be near an exit of a cleaning device storage area and the sound profile of the detected cleaning device sound does not match a stored cleaning device identifier with a last known location in proximity of the area, the system may create a new cleaning device identifier in the cleaning device database to begin tracking a new cleaning event.

In step 240, the location information of the cleaning device identifier matched in step 230 is updated with the current location of the cleaning device determined in step 220. In some embodiments, the system may maintain a location history of the cleaning device associated with the cleaning device identifier and the current location may be added to the location history. After step 240, the current location may be used as a last known location for further matches. Generally, in some embodiments, the current location, the last known location, and the location history of the cleaning device may be represented as areas, sections, and/or coordinate (s) within the shopping space. In some embodiments, the location information may further include a timestamp such that the system records the cleaning device's route, speed, and dwell time(s) along the route.

In step 250, the sound profile of the cleaning device identifier matched in step 230 is updated with the cleaning device sound captured and identified in step 210. In some embodiments, the system may track a history of changing cleaning device sounds, and the captured cleaning device may be added to the sound profile. In this way, the system may continuously monitor the operational fitness of one or more cleaning devices by detecting changes in sounds emitted from the cleaning device that may indicate signs of wear or imminent failure of one or more device components. In some embodiments, the captured sound may replace the previously recorded sound as the sound profile. In some embodiments, the sound profile may be at least partially modified based on the captured sound. The updated sound profile may then be used for matching the cleaning device identifier to subsequently detected cleaning device sounds.

In step 260, the system determines that a component of the cleaning device needs to be replaced. As appreciated by one of ordinary skill in the art, various mechanical components of floor cleaning machines may have limited lifespans and/or may require replacing from time to time, depending on, for example, frequency of use, operating conditions, frequency of maintenance, etc. Mechanical components of floor cleaning devices that may need replacing may include, but are not limited to, various buffing pads, scrubbing pads, squeegees, brooms, brushes, vacuum bags, filters, motors, switches, solenoids, pumps, circuit breakers, belts, hoses, cables, connectors, a cleaning solution container, a fuel container, wheels/tires, and the like. Similarly, consumable components that may need replacing may include, but are not limited to, cleaning solutions, strippers, sealers, finishers, and the like, and fuels, such as, for example, propane.

As one or more components of the cleaning device begins to fail or show signs of wear or imminent failure, characteristics of the sounds emitted from the cleaning device (e.g. frequency, tone, modulation, amplitude, duration, etc.) may change over time. In some embodiments, the system may determine that one or more components of the cleaning device needs to be replaced based on, for example, a detected change in characteristics of one or more cleaning device sounds over time. In some embodiments, the system may determine, or even predict, that one or more components of the cleaning device needs to be replaced based on, for example, a distance traveled by the cleaning device and/or the duration of operation of the cleaning device, both of which may correlate to expected lifespans of various components in the device.

After step 260, steps 210-260 may be repeated for each instance of a detected cleaning device sound to track the location history of one or more cleaning device identifiers and to monitor the operational fitness of one or more cleaning devices. By repeating this process, the system may constantly track and update locations of cleaning devices and may constantly monitor the operational fitness of the cleaning devices in the shopping space based on their location history and changing sound characteristics.

In some embodiments, the location history of the cleaning device identifier may be used to map out cleaning routes for analysis. For example, the system may determine an optimum schedule and/or route for one or more cleaning device(s) in one or more zones in the shopping space based on, for example, cleaning device availability, previous tracked routes, frequency of use, known customer traffic patterns, etc. in the one or more zones of the shopping space. In such a case, the system may update a cleaning schedule database to reflect the optimum schedule and/or route(s) for the cleaning device(s) in the one or more zones of the shopping space. In some embodiments, the system may be configured to estimate the wear-and-tear of a floor surface being cleaned (or having been previously cleaned) by a cleaning device based on the cleaning history one or more tracked routes. For example, the system may determine that floor surfaces comprising one or more tracked routes may need to be refinished, refurbished, or even replaced based on, for example, the frequency of cleaning of the tracked routes. In such a case, the composition of the floor surface may also be taken into account, as the lifespan of different floor surfaces may vary significantly.

In some embodiments, the system may generate one or more alerts and/or tasks indicating that a specific component of the cleaning device needs to be replaced. In some embodiments, the system may further provide a user interface for viewing and analyzing the tracked routes of the cleaning devices. In some embodiments, the system may cause user interfaces on user devices to display alerts and/or task assignments based on the analysis of the tracked routes of the cleaning devices.

Figure 3:
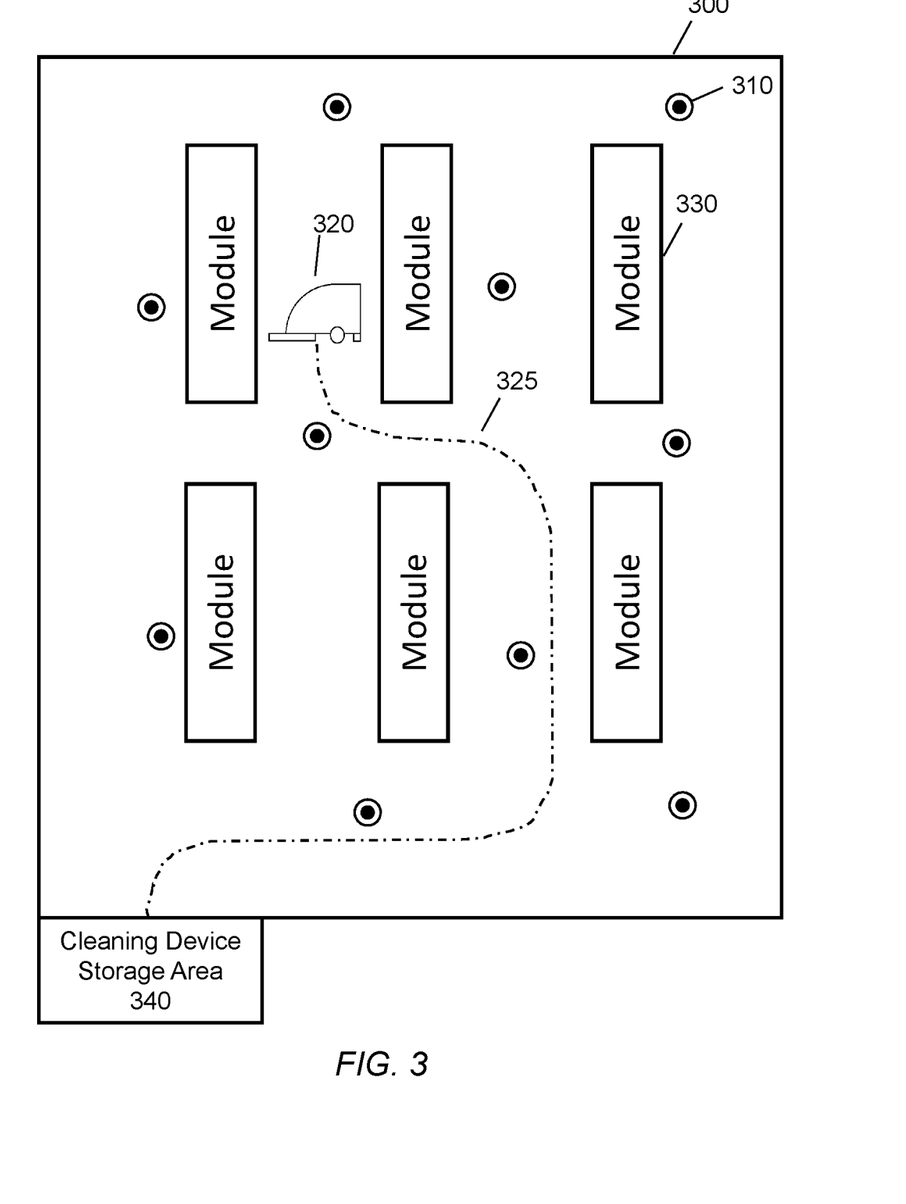
FIG. 3 is an illustration of a shopping space in accordance with several embodiments.

Next referring to FIG. 3, an illustration of a shopping space according to some embodiments is shown. The shopping space 300 comprises a plurality of display modules (also called modulars) 330, a cleaning device storage area 340, and a plurality of sound sensors 310 positioned throughout the shopping space. When a cleaning device 320 leaves a storage area 340, the system may assign a cleaning device identifier to the cleaning device 320 and record an initial sound profile for the cleaning device identifier. When one or more of the sound sensors 310 detects a cleaning device sound, the system may determine a location of the cleaning device sound based on one or more of triangulation and/or trilateration. The system then determines whether the detected cleaning device sound matches the sound profile of a stored cleaning device identifier. If a match is found, the location of the cleaning device sound is added to the tracked route of the cleaning device 320 and the sound profile of the cleaning device identifier is updated with the newly captured cleaning device sound. Over time, the system may continuously update the location history and the sound profile of the cleaning device 320 and map out a route 325 of the cleaning device 320. The system may also continuously monitor the operational fitness of the cleaning device 320 by detecting changes in sounds emitted from the cleaning device that may indicate signs of wear or imminent failure of one or more device components.

In some embodiments, each location point on the route 325 may include a time stamp that the system records the speed and/or dwell time of the cleaning device 320 at each location along the route. In some embodiments, the system may determine that a component of the cleaning device 320 needs to be replaced based on at least one of a distance traveled by the cleaning device 320, a duration of operation of the cleaning device 320, and a detected change in one or more cleaning device sounds over time. In some embodiments, the system may track a plurality of cleaning devices 320 in the shopping space 300 and record traffic patterns and operational fitness of a plurality of cleaning devices 320 in the shopping space 300 over time.

In one embodiment, a system for tracking a cleaning device in a shopping space comprises: a sound sensor array covering at least a portion of the shopping space, a cleaning device database storing location information and sound profiles associated with a plurality of cleaning device identifiers, and a control circuit coupled to the sound sensor array and the cleaning device database. The control circuit is configured to: identify, in sounds captured by the sound sensor array, a cleaning device sound made by a movement of a cleaning device traveling in the shopping space, determine a current location of the cleaning device based on the cleaning device sound, match the cleaning device to a cleaning device identifier in the cleaning device database based on at least comparing the current location of the cleaning device to the location information of the plurality of cleaning device identifiers, update the location information associated the cleaning device identifier in the cleaning device database based on the current location of the cleaning device, update the sound profile of the cleaning device identifier based on the cleaning device sound captured by the sound sensor array, and determine that a component of the cleaning device needs to be replaced based on at least one of a distance traveled by the cleaning device, a duration of operation of the cleaning device, and a detected change in one or more cleaning device sounds over time.

In one embodiment, a method for tracking a cleaning device in a shopping space comprises: identifying, in sounds captured by a sound sensor array covering at least a portion of the shopping space, a cleaning device sound made by a movement of a cleaning device traveling in the shopping space, determining, by a control circuit coupled to the sound sensor array, a current location of the cleaning device based on the cleaning device sound, matching, by the control circuit, the cleaning device to a cleaning device identifier in a cleaning device database storing location information and sound profiles associated with a plurality of cleaning device identifiers, based at least on comparing the current location of the cleaning device to the location information of the plurality of cleaning device identifiers, updating, by the control circuit, the location information associated the cleaning device identifier in the cleaning device database based on the current location of the cleaning device, updating, by the control circuit, the sound profile of the cleaning device identifier based on the cleaning device sound captured by the sound sensor array, and determining that a component of the cleaning device needs to be replaced based on at least one of a distance traveled by the cleaning device, a duration of operation of the cleaning device, and a detected change in one or more cleaning device sounds over time.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for tracking a cleaning device in a shopping space comprising:
   a sound sensor array comprising a plurality of stationary sound sensors positioned throughout the shopping space;
   a cleaning device database storing location information and sound profiles associated with a plurality of cleaning device identifiers; and
   a control circuit coupled to the sound sensor array and the cleaning device database, the control circuit being configured to:
      identify, in sounds captured by the sound sensor array, a cleaning device sound made by a movement of a cleaning device traveling in the shopping space based on one or more of a frequency, tone, modulation, amplitude, and duration of the sounds captured by the sound sensor array;
      determine a current location of the cleaning device based on triangulation of the cleaning device sound and amplitudes of the cleaning device sound captured by two or more of the stationary sound sensors spaced apart from one another in the shopping space;
      match the cleaning device to a cleaning device identifier in the cleaning device database based on at least comparing the current location of the cleaning device to the location information of the plurality of cleaning device identifiers and comparing the cleaning device sound with the sound profiles of the plurality of cleaning device identifiers;
      update the location information associated the cleaning device identifier in the cleaning device database based on the current location of the cleaning device;
      update the sound profile of the cleaning device identifier based on the cleaning device sound captured by the sound sensor array; and
      determine that a component of the cleaning device needs to be replaced based on at least one of a distance traveled by the cleaning device, a duration of operation of the cleaning device, and a detected change in one or more cleaning device sounds over time.

2. The system of claim 1, wherein the cleaning device is matched to the cleaning device identifier further based on comparing the current location of the cleaning device with a direction of travel associated with the plurality of cleaning device identifiers.

3. The system of claim 1, wherein the cleaning device sound corresponds to at least one of a sound produced by a cleaning surface of the cleaning device contacting a floor surface being cleaned by the cleaning device, a sound produced by a fuel container coupled to the cleaning device, a sound produced by a pump coupled to the cleaning device, and a sound produced by a motor coupled to the cleaning device.

4. The system of claim 1, wherein the sound sensor array comprises a plurality of directional microphones.

5. The system of claim 1, wherein the control circuit is further configured to determine a route traveled by the cleaning device based on a history of tracked locations of the cleaning device over time.

6. The system of claim 1, wherein the control circuit is further configured to generate an alert that the component of the cleaning device needs to be replaced.

7. The system of claim 1, further comprising a cleaning schedule database storing floor cleaning schedules for the shopping space, wherein the control circuit is further configured to:
   determine an optimum schedule and/or route for the cleaning device in one or more zones in the shopping space based on known customer traffic patterns in the one or more zones of the shopping space; and
   update the cleaning schedule database to reflect the optimum schedule and/or route for the cleaning device in the one or more zones of the shopping space.

8. A method for tracking a cleaning device in a shopping space comprising:
   identifying, in sounds captured by a sound sensor array comprising a plurality of stationary sound sensors positioned throughout the shopping space, a cleaning device sound made by a movement of a cleaning device traveling in the shopping space based on one or more of a frequency, tone, modulation, amplitude, and duration of the sounds captured by the sound sensor array;
   determining, by a control circuit coupled to the sound sensor array, a current location of the cleaning device based on triangulation of the cleaning device sound and amplitudes of the cleaning device sound captured by two or more of the stationary sound sensors spaced apart from one another in the shopping space;
   matching, by the control circuit, the cleaning device to a cleaning device identifier in a cleaning device database storing location information and sound profiles associated with a plurality of cleaning device identifiers, based at least on comparing the current location of the cleaning device to the location information of the plurality of cleaning device identifiers and comparing the cleaning device sound with the sound profiles of the plurality of cleaning device identifiers;
   updating, by the control circuit, the location information associated the cleaning device identifier in the cleaning device database based on the current location of the cleaning device;
   updating, by the control circuit, the sound profile of the cleaning device identifier based on the cleaning device sound captured by the sound sensor array; and
   determining that a component of the cleaning device needs to be replaced based on at least one of a distance traveled by the cleaning device, a duration of operation of the cleaning device, and a detected change in one or more cleaning device sounds over time.

9. The method of claim 8, wherein matching the cleaning device to the cleaning device identifier further comprises: comparing the current location of the cleaning device with a direction of travel associated with the plurality of cleaning device identifiers.

10. The method of claim 8, where the cleaning device sound corresponds to at least one of a sound produced by a cleaning surface of the cleaning device contacting a floor surface being cleaned by the cleaning device, a sound produced by a fuel container coupled to the cleaning device, a sound produced by a pump coupled to the cleaning device, and a sound produced by a motor coupled to the cleaning device.

11. The method of claim 8, wherein the sound sensor array comprises a plurality of directional microphones.

12. The method of claim 8, further comprising determining a route traveled by the cleaning device based on a history of tracked locations of the cleaning device over time.

13. The method of claim 8, further comprising generating an alert that the component of the cleaning device needs to be replaced.

14. The method of claim 8, further comprising:
   determining an optimum schedule and/or route for the cleaning device in one or more zones in the shopping space based on known customer traffic patterns in the one or more zones of the shopping space; and
   updating a cleaning schedule database to reflect the optimum schedule and/or route for the cleaning device in the one or more zones of the shopping space.

15. The system of claim 1, wherein one or more of the plurality of stationary sound sensors are installed in at least one of a celling, pillar, beam, module, or display shelf in the shopping space.

16. The method of claim 8, wherein one or more of the plurality of stationary sound sensors are installed in at least one of a celling, pillar, beam, module, or display shelf in the shopping space.

* * * * *